United States Patent
Dalal et al.

(10) Patent No.: US 7,013,094 B2
(45) Date of Patent: Mar. 14, 2006

(54) RELOAD ERROR COMPENSATION METHOD

(75) Inventors: Edul N. Dalal, Webster, NY (US); D. Rene Rasmussen, Pittsford, NY (US); Peter A. Crean, Penfield, NY (US)

(73) Assignee: Xerox Corporation, Stamford, CT (US)

( * ) Notice: Subject to any disclaimer, the term of this patent is extended or adjusted under 35 U.S.C. 154(b) by 342 days.

(21) Appl. No.: 10/447,562

(22) Filed: May 29, 2003

(65) Prior Publication Data

US 2004/0239964 A1    Dec. 2, 2004

(51) Int. Cl.
*G03G 15/00*    (2006.01)
*G03G 15/08*    (2006.01)

(52) U.S. Cl. .......................................... 399/49; 399/72
(58) Field of Classification Search .................. 399/15, 399/49, 60, 72; 358/406, 504
See application file for complete search history.

(56) References Cited

U.S. PATENT DOCUMENTS

| 4,341,461 | A | 7/1982 | Fantozzi | |
|---|---|---|---|---|
| 5,060,013 | A | 10/1991 | Spence | |
| 5,450,165 | A | 9/1995 | Henderson | |
| 5,543,896 | A | 8/1996 | Mestha | |
| 5,784,667 | A | 7/1998 | Mestha et al. | 399/49 |
| 6,204,869 | B1 | 3/2001 | Raker et al. | 347/129 |
| 6,337,958 | B1 * | 1/2002 | Stanich et al. | 399/49 |
| 6,351,308 | B1 | 2/2002 | Mestha | 356/402 |
| 6,816,687 | B1 * | 11/2004 | Dalal et al. | 399/49 |
| 6,842,590 | B1 * | 1/2005 | Dalal et al. | 399/49 |

* cited by examiner

*Primary Examiner*—Hoang Ngo
(74) *Attorney, Agent, or Firm*—Joseph M. Young

(57) ABSTRACT

A method for improving the image quality, which includes substantially predicting an effect of reload error for at least one toner color of a developed image, modulating the color density of at least one pixel of a digital image to compensate for the predicted effect of the reload error, generating the developed image based upon the modulated digital image.

23 Claims, 6 Drawing Sheets

RELOAD ERROR COMPENSATION METHOD

CROSS-REFERENCE TO RELATED APPLICATIONS

Reference is made to commonly-assigned copending U.S. patent application Ser. Nos. 10/447,424 and 10/447,561, filed herewith, by Dalal, et al, entitled: RELOAD ERROR COMPENSATION IN COLOR PROCESS CONTROL METHODS, now U.S. Pat. No. 6,816,687, issued Nov. 9, 2004 and U.S. Pat. No. 6,842,590, issued Jan. 11, 2005, respectively, the disclosures of which are incorporated herein.

The present invention relates to xerographic process control, and more particularly, to the use of data from prior printed customer images to provide toner control patches that are relatively unaffected by reload.

Many printing devices use donor rolls to transfer toner to the surface of a photoreceptor for developing an image thereon. These donor rolls typically accumulate toner as they rotate. After transferring toner to an image or a portion of an image, the donor roll "reloads" with toner as it rotates. Depending on what was imaged before the image or portion of an image being developed, the donor roll may not be able to accumulate a sufficient level of toner to properly develop the current image. This inability to fully reload the donor roll causes the later drawn image or portion of an image to have an area lighter than it should be.

In particular, hybrid scavengeless development (HSD) systems use a magnetic brush of a conventional two component system in conjunction with a donor roll used in typical single component systems to transfer toner from the magnetic brush to the photoreceptor surface. Consequently, the donor roll must be completely reloaded with toner in just one revolution. The inability to complete reloading of the donor roll in one revolution results in a print quality defect called reload error. Reload error is defined by a depletion of toner on the donor roll of the development housing.

It should be noted that reload error can occur in any device using a donor roll, where the donor roll needs to be completely reloaded in one revolution, and is not limited to HSD systems.

One example of this defect occurs where the structure of an image from one revolution of the donor roll is visible in the image printed by the donor roll on its next revolution, a phenomenon known as ghosting in the art related to single component xerographic development. At locations on the donor roll where previous images were located, the level of toner may be lower than desired. This causes an undesirable lightening of parts of an image, depending on what was imaged earlier. Highly conductive developers aid in the reduction of this defect as developers that are more conductive allow for a more maximal transfer of toner from the magnetic brush to the donor roll. However, reload error problems can still remain.

Adjusting the xerographic parameters can significantly reduce reload error, but this can also lead to high levels of mottle, another image quality problem characterized by the non-uniform printing or coloring of an image. Thus this method for correcting the reload error problem leads to a trade-off between reload error and mottle, and in order to prevent unacceptable reload error problems it is necessary to tolerate a higher level of mottle.

One area where reload error may have a significant effect is in color calibration systems. In copying or printing systems, such as a xerographic copier, laser printer, or ink-jet printer, a common technique for monitoring the quality of prints is to artificially create a "test patch" of a predetermined desired density. The actual density of the printing material (toner or ink) in the test patch can then be optically measured to determine the effectiveness of the printing process in placing this printing material on the print sheet.

In the case of xerographic devices, such as a laser printer, the surface that is typically of most interest in determining the density of printing material thereon is the charge-retentive surface or photoreceptor, on which the electrostatic latent image is formed and subsequently, developed by causing toner particles to adhere to areas thereof that are charged in a particular way. In such a case, the optical device for determining the density of toner on the test patch, which is often referred to as a "densitometer", is disposed along the path of the photoreceptor, directly downstream of the development unit. There is typically a routine within the operating system of the printer to periodically create test patches of a desired density at predetermined locations on the photoreceptor by deliberately causing the exposure system thereof to charge or discharge as necessary the surface at the location to a predetermined extent.

The test patch is then moved past the developer unit and the toner particles within the development unit are caused to adhere to the test patch electrostatically. The denser the toner on the test patch, the darker it will appear in optical testing. The developed test patch is moved past a densitometer disposed along the path of the photoreceptor, and the light absorption of the test patch is tested; the more light that is absorbed by the test patch, the denser the toner on the test patch. Some toner mass sensors also measure the light scattered by test patches in addition to or instead of measuring the light absorbed by the patches to arrive at a toner mass for the patch.

Xerographic test patches are traditionally printed in the interdocument zones on the photoreceptor. They are used to measure the deposition of toner on paper to measure and control the tone reproduction curve (TRC). Generally, each patch is printed as a uniform solid half tone or background area. This practice enables the sensor to read one value on the tone reproduction curve for each test patch.

The traditional method of process controls involves scheduling solid area, uniform halftones or background in a test patch. Some of the high quality printers contain many test patches. During the print run, each test patch is scheduled to have single halftone that would represent a single byte value on the tone reproduction curve. For example, U.S. Pat. No. 5,060,013 discloses a control system using test patches at different locations within the image frame on the photoreceptor. A plurality of sensors is arranged to sample the test areas in defined columns of the frame and measurements coordinated with the location of the test area.

It is also known in the prior art, for example, U.S. Pat. No. 4,341,461 to provide two test targets, each having two test patches, selectably exposed to provide test data in the photoreceptor image area for control of the toner dispensing and bias control loops. In this system, the test patches are imaged in interdocument zones on the photoreceptor. In addition, U.S. Pat. No. 5,450,165 discloses the use of incoming data or customer image data as a test patch. In particular, incoming data is polled for preselected density conditions to be used for test patches to monitor print quality.

It is also known, in pending U.S. Pat. No. 5,543,896, to provide a single test pattern, having a scale of pixel values, in the interdocument zone of the imaging surface and to be able to respond to the sensing of the test pattern and a reference tone reproduction curve to adjust the machine operation for print quality.

Embodiments include a method for improving the image quality, which includes substantially predicting an effect of reload error for at least one toner color of a developed image, modulating the color density of at least one pixel of a digital image to compensate for the predicted effect of the reload error, generating the developed image based upon the modulated digital image.

The invention will be described in detail herein with reference to the following figures in which like reference numerals denote like elements and wherein.

The methods disclosed herein are applicable to printing devices generally, including printers and digital copiers.

Figure 8:
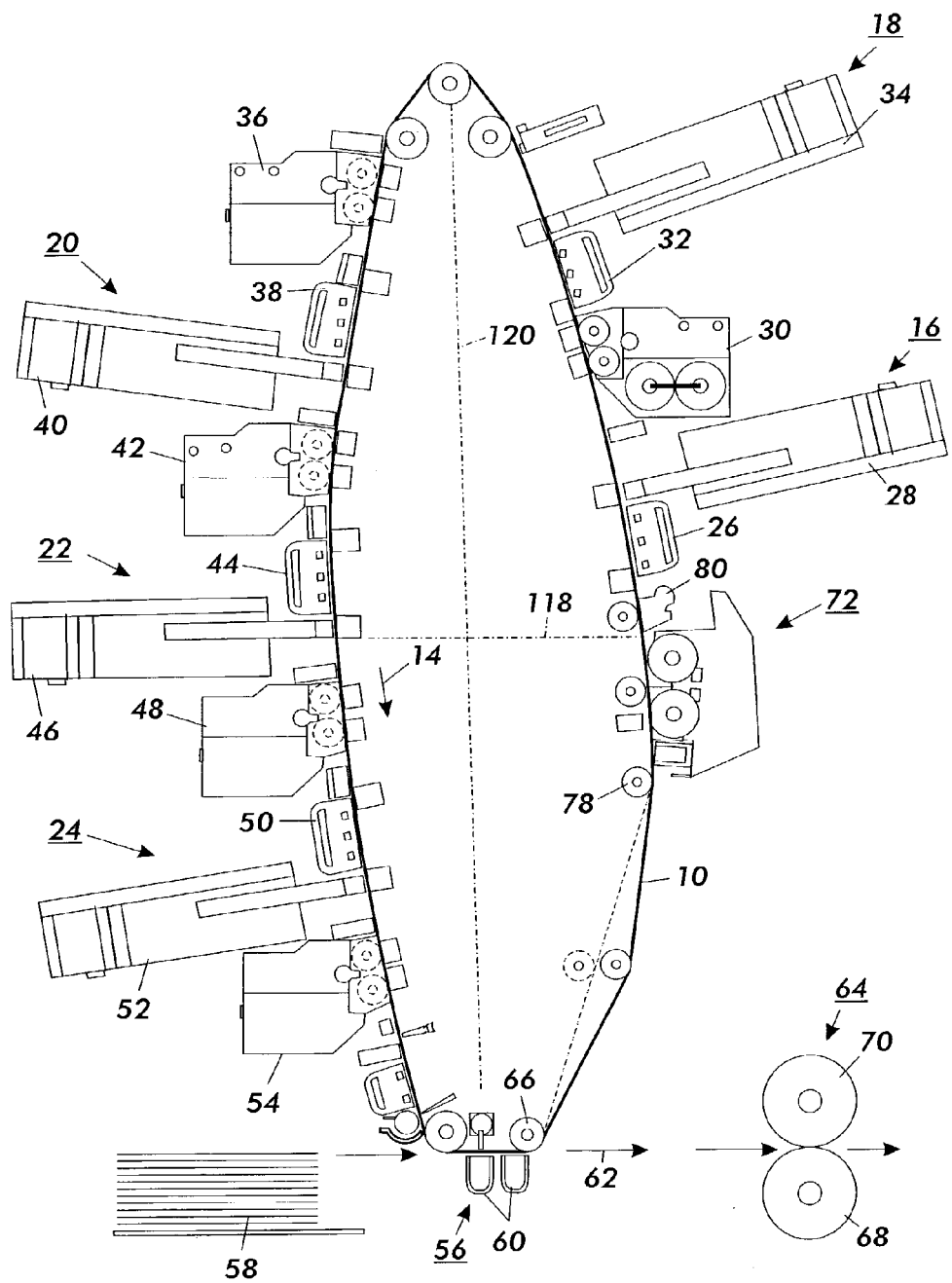
FIG. 8 illustrates a schematic view of an exemplary embodiment of a printing device.

FIG. 8 shows a single pass multi-color printing machine. This printing machine employs a photoconductive belt 10, supported by a plurality of rollers and backer bars. Photoconductive belt 10 advances in the direction of arrow 14 to move successive portions of the external surface of photoconductive belt 10 sequentially beneath the various processing stations disposed about the path of movement thereof. In embodiments, the photoconductive belt 10 travels in a substantially elliptical path. In FIG. 8, the photoconductive belt is shown with major axis 120 and minor axis 118. In embodiments, the printing machine architecture includes five image recording stations indicated generally by the reference numerals 16, 18, 20, 22, and 24, respectively. In embodiments, photoconductive belt 10 initially passes through image recording station 16. Image recording station 16 includes a charging device and an exposure device. The charging device includes including a corona generator 26 that charges the exterior surface of photoconductive belt 10 to a relatively high, substantially uniform potential. After the exterior surface of photoconductive belt 10 is charged, the charged portion thereof advances to the exposure device. The exposure device includes a raster output scanner (ROS) 28, which illuminates the charged portion of the exterior surface of photoconductive belt 10 to record a first electrostatic latent image thereon. Alternatively, a light emitting diode (LED) may be used.

In embodiments, developer unit 30 develops this first electrostatic latent image. Developer unit 30 deposits toner particles of a selected color on the first electrostatic latent image. The first image recording station 16 and developer unit 30 are typically used for special colors, such as ones that are may be used a lot (for example, as part of someone's trademark) or that just may be difficult to fabricate from standard mixing (for example, fluorescent orange). After the highlight toner image has been developed on the exterior surface of photoconductive belt 10, belt 10 continues to advance in the direction of arrow 14 to image recording station 18.

Image recording station 18 includes a recharging device and an exposure device. The charging device includes a corona generator 32, which recharges the exterior surface of photoconductive belt 10 to a relatively high, substantially uniform potential. The exposure device includes a ROS 34 that illuminates the charged portion of the exterior surface of photoconductive belt 10 selectively to record a second electrostatic latent image thereon. In embodiments, this second electrostatic latent image corresponds to the regions to be developed with magenta toner particles. This second electrostatic latent image is now advanced to the next successive developer unit 36.

In embodiments, developer unit 36 deposits magenta toner particles on the electrostatic latent image. In this way, a magenta toner powder image is formed on the exterior surface of photoconductive belt 10. After the magenta toner powder image has been developed on the exterior surface of photoconductive belt 10, photoconductive belt 10 continues to advance in the direction of arrow 14 to image recording station 20.

Image recording station 20 includes a charging device and an exposure device. The charging device includes corona generator 38, which recharges the photoconductive surface to a relatively high, substantially uniform potential. The exposure device includes ROS 40, which illuminates the charged portion of the exterior surface of photoconductive belt 10 to selectively dissipate the charge thereon to record a third electrostatic latent image, which, in embodiments, corresponds to the regions to be developed with yellow toner particles. This third electrostatic latent image is now advanced to the next successive developer unit 42.

In embodiments, developer unit 42 deposits yellow toner particles on the exterior surface of photoconductive belt 10 to form a yellow toner powder image thereon. These toner particles may be partially in superimposed registration with the previously formed magenta powder image. After the third electrostatic latent image has been developed with yellow toner, photoconductive belt 10 advances in the direction of arrow 14 to the next image recording station 22.

Image recording station 22 includes a charging device and an exposure device. The charging device includes a corona generator 44, which charges the exterior surface of photoconductive belt 10 to a relatively high, substantially uniform potential. The exposure device includes ROS 46, which illuminates the charged portion of the exterior surface of photoconductive belt 10 to selectively dissipate the charge on the exterior surface of photoconductive belt 10 to record a fourth electrostatic latent image. In embodiments, the fourth latent image is developed with cyan toner particles. After the fourth electrostatic latent image is recorded on the exterior surface of photoconductive belt 10, photoconductive belt 10 advances this electrostatic latent image to the cyan developer unit 48.

In embodiments, the cyan developer unit 48 deposits cyan toner particles on the fourth electrostatic latent image. These toner particles may be partially in superimposed registration with the previously formed yellow or magenta toner powder images. After the cyan toner powder image is formed on the exterior surface of photoconductive belt 10, photoconductive belt 10 advances to the next image recording station 24.

Image recording station 24 includes a charging device and an exposure device. The charging device includes corona generator 50, which charges the exterior surface of photoconductive belt 10 to a relatively high, substantially uniform potential. The exposure device includes ROS 52, which, in embodiments, illuminates the charged portion of the exterior surface of photoconductive belt 10 to selectively discharge those portions of the charged exterior surface of photoconductive belt 10 that are to be developed with black toner particles. The fifth electrostatic latent image, to be developed with black toner particles, is advanced to black developer unit 54.

In embodiments, the black developer unit 54, deposits black toner particles on the exterior surface of photoconductive belt 10. These black toner particles form a black toner powder image that may be partially or totally in superimposed registration with the previously formed yellow, magenta, and cyan toner powder images. In this way, a multi-color toner powder image is formed on the exterior surface of photoconductive belt 10. Thereafter, photoconductive belt 10 advances the multi-color toner powder image to a transfer station, indicated generally by the reference numeral 56.

At transfer station 56, a receiving medium, i.e., paper, is advanced from stack 58 by sheet feeders and guided to transfer station 56. At transfer station 56, a corona generating device 60 sprays ions onto the backside of the paper. This attracts the developed multi-color toner image from the exterior surface of photoconductive belt 10 to the sheet of paper. Stripping assist roller 66 contacts the interior surface of photoconductive belt 10 and provides a sufficiently sharp bend thereat so that the beam strength of the advancing paper strips from photoconductive belt 10. In embodiments, a vacuum transport moves the sheet of paper in the direction of arrow 62 to fusing station 64.

Fusing station 64 includes a heated fuser roller 70 and a back-up roller 68. The back-up roller 68 is resiliently urged into engagement with the fuser roller 70 to form a nip through which the sheet of paper passes. In the fusing operation, the toner particles coalesce with one another and bond to the sheet in image configuration, forming a multi-color image thereon. After fusing, the finished sheet is discharged to a finishing station where the sheets are compiled and formed into sets that may be bound to one another. These sets are then advanced to a catch tray for subsequent removal therefrom by the printing machine operator.

One skilled in the art will appreciate that while the multi-color developed image has been disclosed as being transferred to paper, it may be transferred to an intermediate member, such as a belt or drum, and then subsequently transferred and fused to the paper. Furthermore, while toner powder images and toner particles have been disclosed herein, one skilled in the art will appreciate that a liquid developer material employing toner particles in a liquid carrier may also be used.

Invariably, after the multi-color toner powder image has been transferred to the sheet of paper, residual toner particles remain adhering to the exterior surface of photoconductive belt 10. The photoconductive belt 10 moves over isolation roller 78, which isolates the cleaning operation at cleaning station 72. At cleaning station 72, the residual toner particles are removed from photoconductive belt 10. Photoconductive belt 10 then moves under spots blade 80 to also remove toner particles therefrom.

Figure 1:
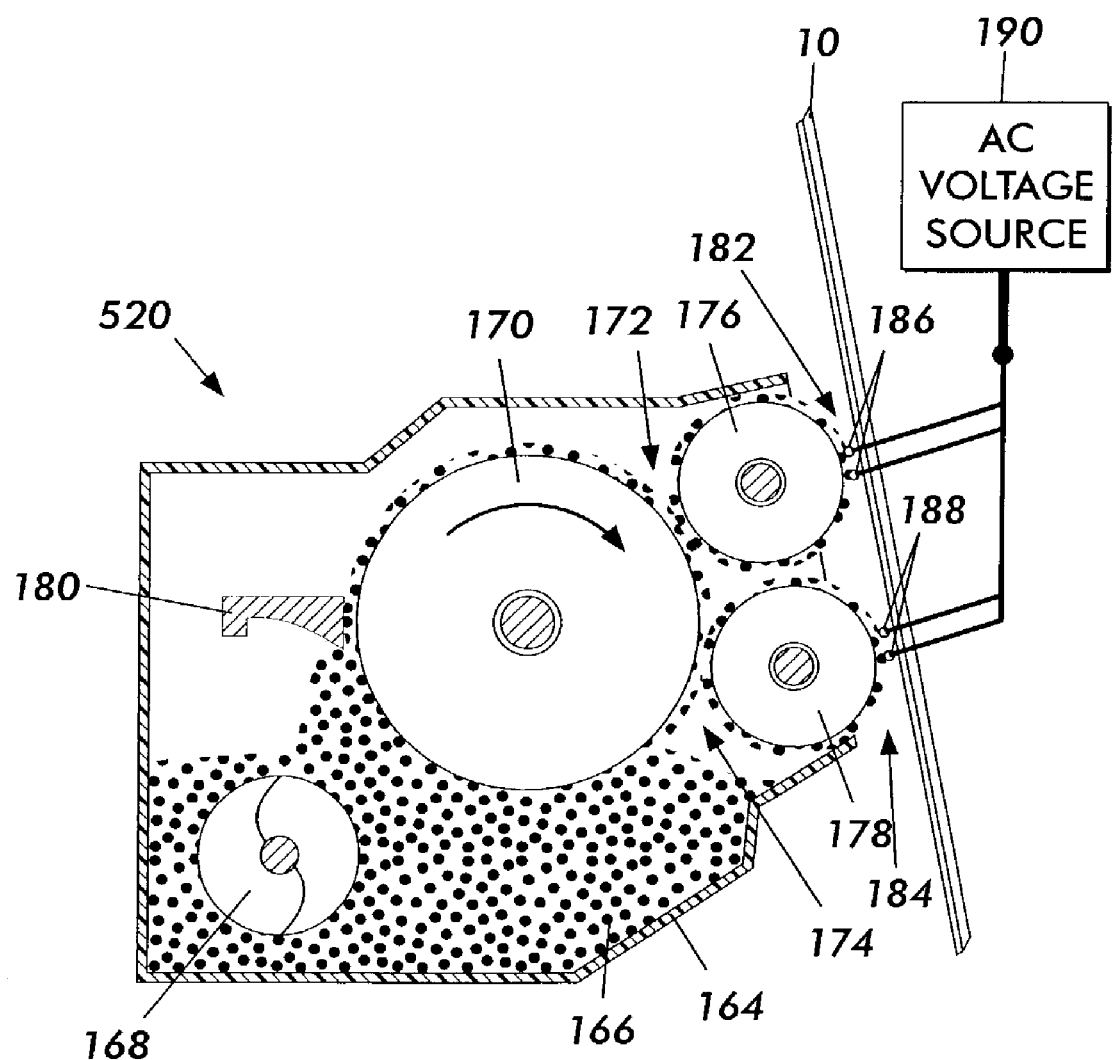
FIG. 1 is a schematic view an exemplary embodiment of a development apparatus.

FIG. 1 shows an exemplary embodiment of a development unit. The apparatus comprises a reservoir 164 containing developer material 166. The developer material 166 is of the two component type, that is it comprises carrier granules and toner particles. The reservoir includes augers, indicated at 168, which are rotatably-mounted in the reservoir chamber. The augers 168 serve to transport and to agitate the material within the reservoir and encourage the toner particles to charge tribo-electrically and adhere to the carrier granules. In embodiments, a magnetic brush roll 170 transports developer material from the reservoir to the loading nips 172, 174 of two donor rolls 176, 178. Magnetic brush rolls are well known, so the construction of roll 170 need not be described in great detail. Briefly the roll comprises a rotatable tubular housing within which is located a stationary magnetic cylinder having a plurality of magnetic poles impressed around its surface. The carrier granules of the developer material are magnetic and, as the tubular housing of the roll 170 rotates, the granules (with toner particles adhering tribo-electrically thereto) are attracted to the roll 170 and are conveyed to the donor roll loading nips 172, 174. A metering blade 180 removes excess developer material from the magnetic brush roll and ensures an even depth of coverage with developer material before arrival at the first donor roll loading nip 172. At each of the donor roll loading nips 172, 174, toner particles are transferred from the magnetic brush roll 170 to the respective donor roll 176, 178.

Each donor roll transports the toner to a respective development zone 182, 184 through which the photoconductive belt 10 passes. Transfer of toner from the magnetic brush roll 170 to the donor rolls 176, 178 can be encouraged by, for example, the application of a suitable D.C. electrical bias to the magnetic brush and/or donor rolls. The D.C. bias (for example, approximately 70 V applied to the magnetic roll) establishes an electrostatic field between the donor roll and magnetic brush rolls, which causes toner particles to be attracted to the donor roll from the carrier granules on the magnetic roll.

The carrier granules and any toner particles that remain on the magnetic brush roll 170 are returned to the reservoir 164 as the magnetic brush continues to rotate. The relative amounts of toner transferred from the magnetic roll 170 to the donor rolls 176, 178 can be adjusted, for example by: applying different bias voltages to the donor rolls; adjusting the magnetic to donor roll spacing; adjusting the strength and shape of the magnetic field at the loading nips and/or adjusting the speeds of the donor rolls.

At each of the development zones 182, 184, toner is transferred from the respective donor roll 176, 178 to the latent image on the belt 10 to form a toner powder image on the latter. Various methods of achieving an adequate transfer of toner from a donor roll to a photoconductive surface are known and any of those may be employed at the development zones 182, 184.

In FIG. 1, each of the development zones 182, 184 is shown as having the form i.e. electrode wires are disposed in the space between each donor roll 176, 178 and photoconductive belt 10. FIG. 1 shows, for each donor roll 176, 78, a respective pair of electrode wires 186, 188 extending in a direction substantially parallel to the longitudinal axis of the donor roll. The electrode wires are made from thin (i.e. 50 to 100 micron diameter) stainless steel wires, which are closely spaced from the respective donor roll. The wires are self-spaced from the donor rolls by the thickness of the toner on the donor rolls. The distance between each wire and the respective donor roll is within the range from about 5 micron to about 20 micron (typically about 10 micron) or the thickness of the toner layer on the donor roll. An alternating electrical bias is applied to the electrode wires by an AC voltage source 190.

The applied AC establishes an alternating electrostatic field between each pair of wires and the respective donor roll, which is effective in detaching toner from the surface of the donor roll and forming a toner cloud about the wires, the height of the cloud being such as not to be substantially in contact with the belt 10. The magnitude of the AC voltage in the order of 200 to 500 volts peak at frequency ranging from about 8 kHz to about 16 kHz. A DC bias supply (not shown) applied to each donor roll 176, 178 establishes electrostatic fields between the photoconductive belt 10 and donor rolls for attracting the detached toner particles from the clouds surrounding the wires to the latent image recorded on the photoconductive surface of the belt.

The foregoing should suffice to describe examples of development systems wherein the embodiments disclosed herein may be useful. It should be obvious that the methods described herein do not apply to the particular developer systems described in the preceding paragraphs, but are applicable in many donor roll systems with any number of donor rolls, and more generally, any system where a donor roll(s) has a finite amount of time to collect toner before transferring toner to the image surface.

Figure 2:
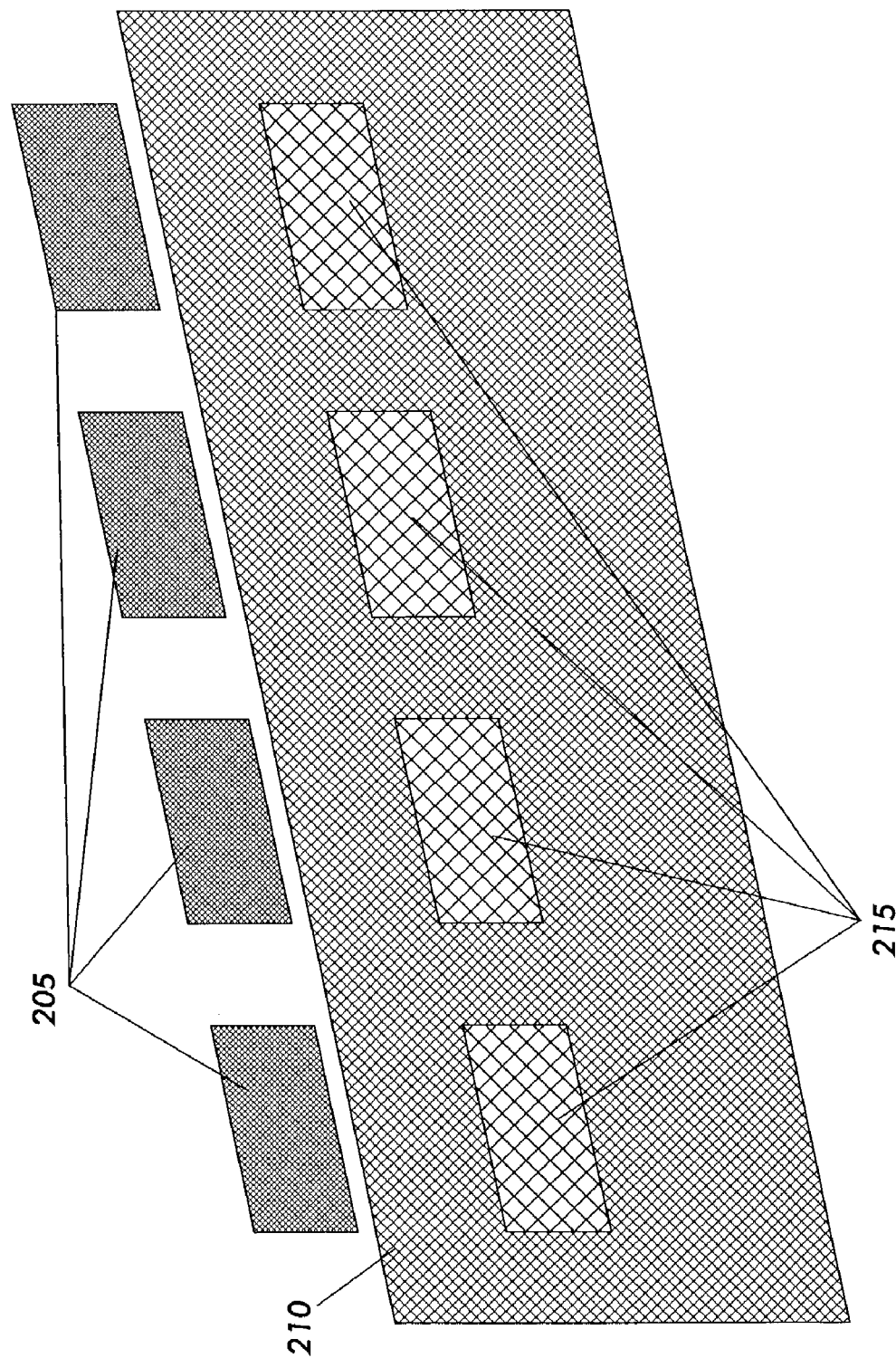
FIG. 2 illustrates an example of the effect of reload error.

Reload error results from the effects that previously printed images have on the current image. The image being printed is lighter than it should be due to what was previously printed. FIG. 2 illustrates an example of the effect of reload error. For this example, black toner is being used to illustrate reload error. However, reload error can occur with any color toner. Each color separation will have its own reload issues. The amount of correction required to substantially reduce the effect of reload error varies based upon the color of the toner. Other factors such as, for example, toner composition, donor roll size, and printer speed also contribute.

Each of the parallelograms 205 in FIG. 2 causes lightened images 215 to appear in the gray patch 210. This is because the locations along the donor rolls 176, 178 which contributed to the development of the parallelogram images 205 were not able to pick up sufficient toner to create an even colored gray surface. As each donor roll 176, 178 rotates and acquires toner, it acquires toner substantially uniformly across its surface. When the toner is transferred to a substrate, more toner is transferred from the surface of the donor rolls to the surface of the substrate where undeveloped electrostatic images of the parallelograms 205 are located. As the donor rolls rotate and acquires more toner for new image 210, the surface area of each roll that donated toner to the parallelogram images 205 has substantially less toner on it than the remainder of its surface. Because the areas of the donor roll that contributed toner to the parallelogram images 205 begin with substantially less toner than the remaining area of the roll, these areas do not acquire enough toner to result in an even coat of toner on the roll. Therefore, when the next image 210 is printed, the areas 215 end up lighter than the rest of the image 210. This is an illustration of the effect known as reload error.

One method for reducing the effects of reload error includes modulating the digital image before it is transferred to a substrate. In general, modulation of the digital image involves darkening any given pixel as a function of the digital count at that pixel and the imaging history of all previous pixels. The digital image can be darkened as required to compensate for an effect of reload error before printing, and therefore minimize or eliminate the extent of the effects of reload error visible to the customer. As used herein, "compensate" means any level of image improvement in the developed image over what the output would have been had the digital image been unmodulated. Then the xerographic parameters can be adjusted to reduce mottle. Modulating the digital image to minimize the effects of reload error can be made relatively inexpensive in terms of memory and computing resources required, by taking into account the spatial characteristics of reload error and the limitations of human visual perception.

The problem of determining how to modify the digital image to compensate for reload error can be significantly simplified by the following considerations:

1. Reload error is a spatially diffuse phenomenon, with a relatively undemanding modulation transfer function. Therefore some of the image processing can be done at low resolution (in embodiments, a resolution of about 25~50 dpi was sufficient).

2. Reload error at any given low-resolution pixel is independent of the imaging history of all other pixels in the same fast-scan row (i.e., transverse to the direction of media travel).

3. Reload error at any given low-resolution pixel is independent of the imaging history of all other pixels in the same slow-scan column, except for pixels at multiples of a fixed distance. This fixed distance corresponds to the circumference of the donor roll.

4. The contribution to reload error from previous rotations of the donor roll is heavily damped, such that the effect becomes essentially invisible after a few rotations. In embodiments, only the three previous rotations contributed significantly to reload error.

5. The visible effect of reload error is negligible at very light portions of the image. Consequently, reload error compensation is not required when approaching non-imaged areas, reducing the possibility of artifacts.

6. The visible effect of reload error is small at very dark portions of the image. Consequently, reload error compensation is not required when approaching 100% imaged areas.

7. Reload error is completely independent of all other separations. Thus, the C separation is totally unaffected by reload error occurring in the M, Y or K separations.

In view of these considerations, a method for modifying the digital image can be represented by an equation such as Equation 1. Equation 1 represents a method of modifying a digital image to compensate for the effects of reload error for a particular color separation j at a particular pixel i=0.

$$D_{j,i=0} = D'_{j,i=0} + q[D'_{j,i=0}, D_{j(i=1 \to n)}, D^*_{j(i=1 \to n)}, j] \tag{1}$$

where D represents the output (modulated) digital count, and D' represents the input digital count for a particular pixel. The function q represents the modification required to overcome the effects of reload error. In other words, an empirical formula for reload error RE for a particular separation j can be written as $$RE_{j,i=0} = -q[D'_{j,0}, D_{j(i=1 \to n)}, D^*_{j(i=1 \to n)}, j] \tag{2}$$

Figure 3:
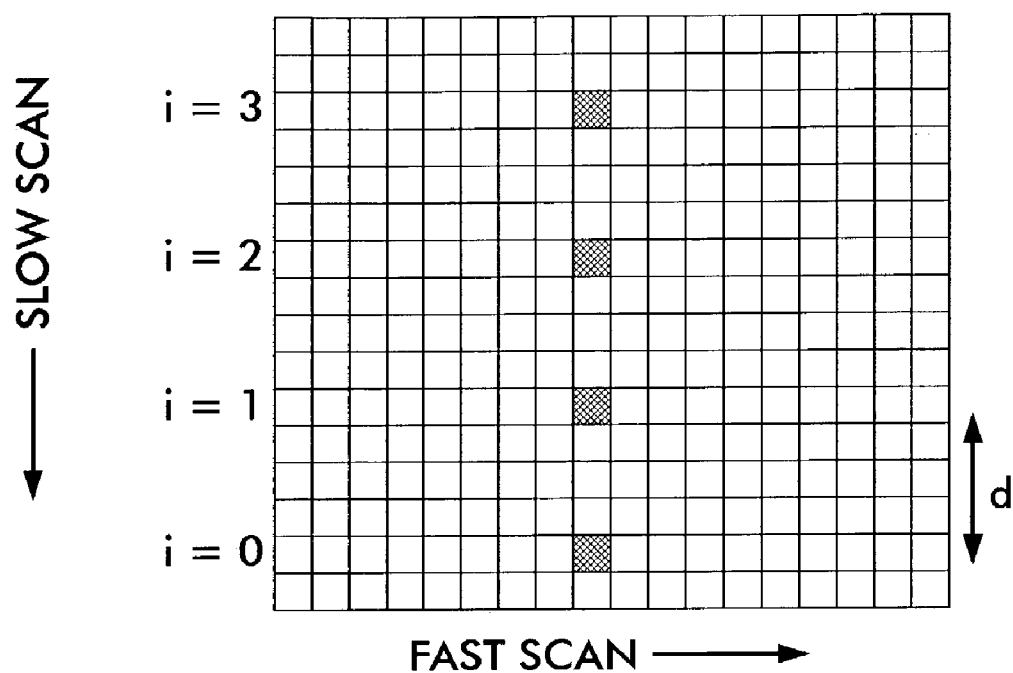
FIG. 3 is a schematic representation of pixels on a substrate

In the above equations, D=0 represents the lowest density (bare paper) and D=255 represents the maximum density of a particular color j. In embodiments, the color j is typically one of cyan, magenta, yellow, or black. However, reload error can occur while any color is being printed. The general subscript i refers to the position of a low-resolution pixel in a given slow-scan column, in multiples of the donor roll circumference d. See FIG. 3. The slow-scan column is the direction of travel of the media to which the image is being transferred. Thus, i=0 refers to the pixel being modulated, while i=1 refers to the pixel a distance d earlier in the same slow-scan column, i=2 refers to the pixel a distance 2d earlier in the same slow-scan column, and so on, as shown in FIG. 3. The number n is the maximum number of rotations of the donor roll that need to be considered before the effect of reload error becomes negligible. In many cases, n will be well below 10. For example, 3 rotations is usually sufficient. After that, the effects of reload error usually become negligible for most purposes. D* refers to the digital count of pixels surrounding the previous pixels indicated by i, and represents the spatially diffuse nature of reload error. It is important that the diffuse nature of reload error be taken into account, since otherwise the reload error compensation could lead to artifacts.

Definition: The term pixel as used throughout the remainder of the specification may mean one or multiple pixels. It should be noted that the ith position can also refer to the central position of a cluster of pixels as opposed to just one pixel. The resolution required and the influence of surrounding pixels will vary from machine to machine. Therefore when determining the influence of prior "pixels," pixel clusters rather than pixels may need to be viewed. For simplicity's sake, the term pixel has been defined to encompass multiple pixels to cover these situations.

While the above equation includes the relevant contributors to reload error, it does not suggest how each of the factors contributes. The digital image modulation (or darkening) function q in Equation 1 could be a very complex function because it has many independent variables. However, the effect of each of the factors of function q can be determined from empirical evidence.

In embodiments, Equation 1 may be separable, depending upon, for example, the characteristics of a particular device. If Equation 1 is separable, we can simplify Equation 1, by separating out some of the independent or substantially independent variables into separate subfunctions. For example, the color density of the pixel being printed significantly influences the visibility of reload error.

Therefore, as a first step towards simplification, the function q can be separated into independent functions $f$ and G as follows:

$$D_{i=0} - D'_{i=0} = f[D'_{i=0}] \cdot G[D_{(i=1 \to n)}, D^*_{(i=1 \to n)}, j] \quad (3)$$

where the function $f$ refers to the contribution from the current pixel i=0, while the function G refers to the contribution due to the imaging history. Using the previously cited information about reload error, it is possible to further simplify function G and determine the behavior of functions $f$ and G.

One possible simplified implementation of Equation 3 involves calculating the history contribution function G at low resolution such as, for example, 25~50 dpi. This resolution is chosen to approximate the spatially diffuse nature of reload error. Assuming the actual resolution of the image is relatively high, using low resolution considerably speeds solving for G. The function G is then converted to the true resolution (e.g., 600 dpi) by interpolation. The function $f$ and hence the total modulation function q are then calculated at the true resolution.

Figure 4:
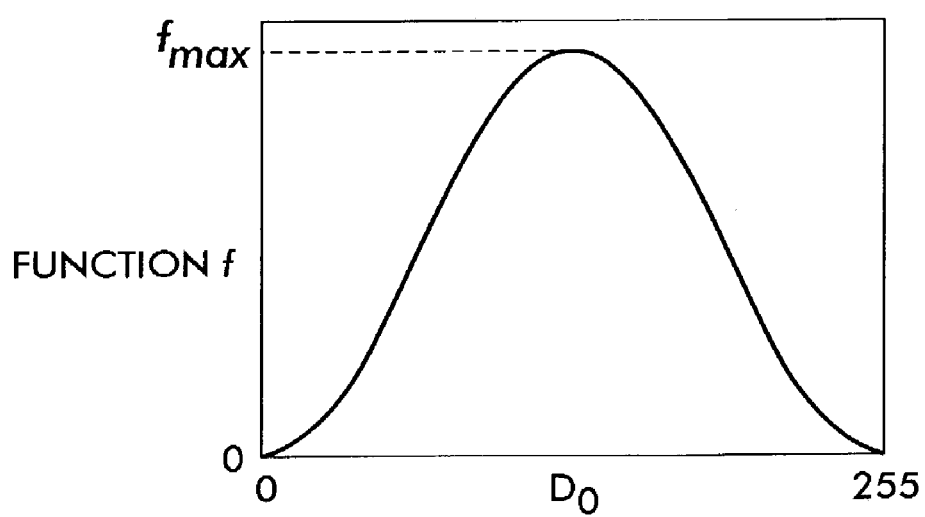
FIG. 4 is a graph showing the relationship between the contribution to reload error of a current pixel by the pixel being printed and more precisely, by the density of the color at that location.

First, from the enumerated factors 5 and 6, we can determine the behavior of functions $f$. If the color density of the pixel being printed is very light or very dark, the effect of reload error is typically minimal as illustrated in the graph of FIG. 4. Generally, $f$ is expected to be bell-shaped, having a value of 0 at $D'_0=0$ and at $D'_0=255$, with a peak $f_{max}$ between the extreme values, as shown in FIG. 4. As reload error results in a lightening of images, this should be obvious for pixels having a low color density. On the other hand, for pixels having a high color density, the effect of reload error will not be significantly visible. Moreover, the ability to compensate for reload error is limited in such cases as a pixel generally cannot be darkened to more than 100%. FIG. 4 illustrates the general behavior of function $f$. The specific details of function $f$ are not universal and are going to vary from machine to machine. The curve may be more V-shapeD or U-shaped, or the center may be shifted towards one end or the other. However, one only has to run a few tests at varied densities to achieve a more precise form for function $f$ for a particular machine and a particular color. Regardless, at 0 and 255 function $f$ is expected to be approximately 0.

Because G can be calculated at a low resolution, condition, the factor D* can be discarded. The effects of the surrounding pixels become much less influential as the low resolution pixels encompass a larger area on the sheet. Using factors 1, 4, and 7, function G can now be further simplified as shown in Equation 4. The functions g, h, and m are discussed below.

$$D_{i=0} - D'_{i=0} = f(D'_{i=0}) \cdot \left[ \sum_{i=1}^{n} \{g(D_i) \cdot h(i)\} \right] \cdot m(j) \quad (4)$$

Figure 5:
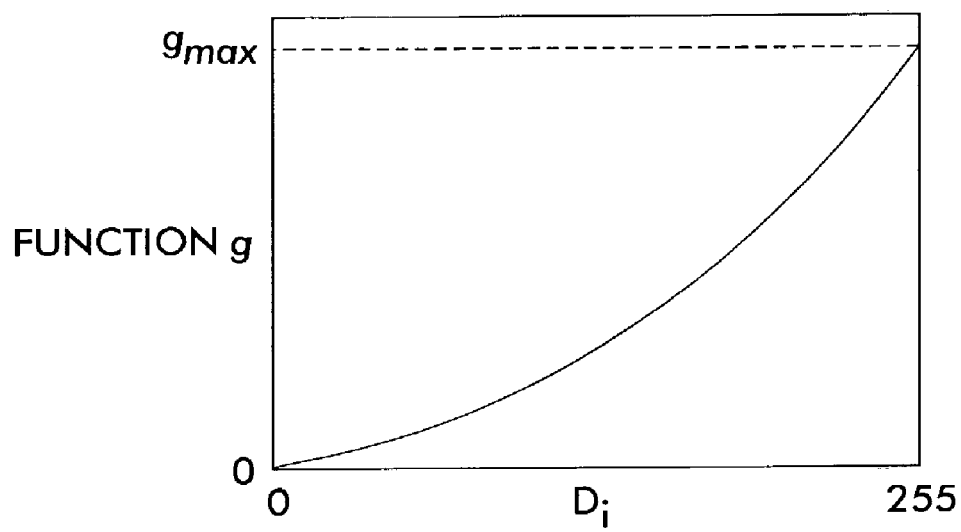
FIG. 5 is a graph showing the relationship between the contribution to reload error of the current pixel by previously printed pixels separated by integer number donor roll rotations.

The function g describes the effect of each of the previous pixels. The effect of each prior pixel directly corresponds to the color density of that pixel. Therefore function g monotonically increases from a value of 0 at $D_i=0$ to some maximum value $g_{MAX}$ at $D_i=255$, as shown in FIG. 5. The exact shape of this curve may vary more greatly from machine to machine. It may be more linear or bow the other direction. The nature of this function will be more highly dependent on the characteristics of the machine, especially the developer and the nature of the toner.

Figure 6:
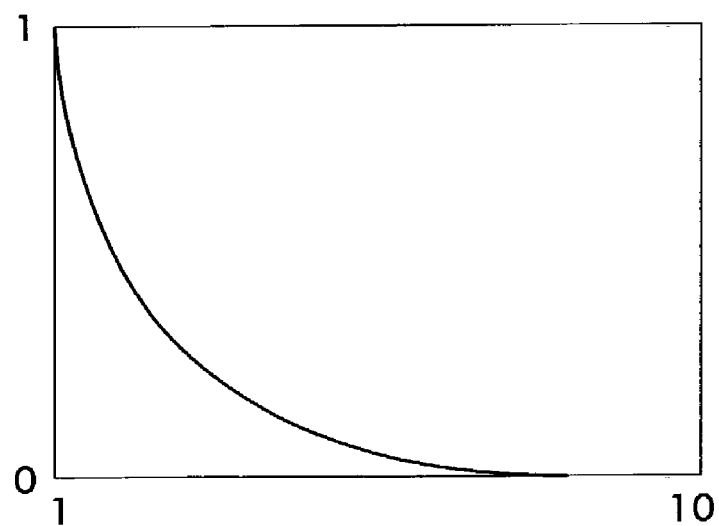
FIG. 6 is a graph illustrating the decreasing effect of older pixels as the site where they were located on the donor roll gets repeatedly overwritten.

The function h describes the damping of the previous pixels. The further back in time a pixel was printed, the less effect it will have on the present pixel. Therefore, this function monotonically decreases from a value of 1 unit at i=1 to zero at large values of i, as shown in FIG. 6. The nature of this function will also be subject to variation. The only constant that can be expected between machines is that as i increases, h(i) decreases. However, the rate and manner in which it does so can take any of a number of forms. In its simplest form, h(i)=1 and h(i)=0 for all other i. The number n, which determines how many previous rotations need to be considered, depends on the function h. It is expected that h will virtually always be approximately zero for i equal to 10 or greater. For the vast majority of printing devices, n will not need to exceed a value of 3 or 4 before the damping function, h, makes the contribution negligible. However, this value will vary from machine to machine based upon transfer station characteristics.

The function m describes the amount of compensation required for the separation j, since it is not necessary to apply full compensation to each separation. The function m will essentially be a weighting factor. It will generally be less than one and effectively used to limit reload compensation. Increasing the color density of a digital image can lead to artifacts in the printed image. A proper weighting factor will have to be determined for a particular toner.

As noted at the beginning of the detailed description, the exact form of the functions disclosed in Equations 1–4 will depend upon the color being printed, toner composition, transfer time and donor roll size, and possibly other issues. However, the general qualities of the individual functions should remain the same.

As noted earlier, Equation 1 may not be separable. In that case, determining the function q could be determined directly. Equation 1 as applied to a pixel to be printed, is still going to be dependent upon the color density of that pixel, the color density of N previous pixels, where each of those pixels is separated by one donor roll circumference, and a weight factor. These factors could be varied and the color density of an output pixel or image measured. A function based upon these factors could be determined.

For equations that are separable, one could run numerous tests to determine the contributions of each of the variables. For example, to determine h for a particular separation, the user could print a continuous background having a uniform color density and then print a single spot having a high color density, and measure the reload effect one donor roll circumference distance later, two donor roll circumference distances later, etc. until the effect is no longer detectable. This method can also be used to determine how many previous developed pixels n need to be included at all. If this process is done for each color separation, the relative effects of reload error for each separation can be determined. This may help the user determine values of m for each separation. Similar processes may be used to determine the $f$ and g functions.

When conducting any an experiment to determine one of the functions in Equation 4, it is important to take steps to prevent reload error from affecting the data observed.

The functions $f$, g, and h can be different for different separations. This would be due in part to the different qualities of the corresponding toner corresponding to that separation. In embodiments, the general form of the functions may be similar from color to color. For example, parameters such as the height, $f_{max}$ from FIG. 4 might differ in magnitude between colors, but the general bell-shaped curve may remain the same. For at least some printing devices, generic formulas may be found for the functions $f$, g, and h that work for every color separation, independent of xerographic setup conditions. Parameters such as $f_{max}$ and $g_{max}$ from FIGS. 4 and 5 could be inserted into the generic functions for each color.

The imaging history is tracked relative to the donor roll or rolls and not relative to the start of a photoreceptor panel. Imaging history on one panel can influence the next panel, and interdocument gaps, and any invisible imaging conducted there, should be taken into account. If the damping function can be approximated by an exponential, the summation of g and h over the imaging history of the roll can be a recursive function using a history map of a single rotation, saving calculation and memory.

The image modulation function can be performed automatically by the printing device. The digital image processor can perform the calculation based upon machine parameters. If the reload error compensation parameters prove to be dynamic, these parameters could be altered based on measurements made on printed images as part of operator diagnostics or knowledge of internal developer parameters.

Note that the image modulation will be unlikely to completely 100% compensate for reload. To be explicit, compensation as it is used throughout the text of this patent means any level of improvement greater than zero. However, the proposed method will significantly reduce the effects of reload error. 100% accuracy is not necessary. A 50% improvement would be a significant improvement, and with the method disclosed herein, it is possible to do better than that.

The application of the above equations 1–4 should not be limited by the particular development apparatus shown in FIG. 1. FIG. 1 illustrates an exemplary development apparatus wherein reload error may occur. However, developer systems using donor rolls are well known in the art and reload error can be a problem in other developer systems. The correction methods disclosed herein can be used with other donor roll systems.

The reload compensation process disclosed herein, may be accomplished as part of a batch process, where the data for a complete image may be modulated before it is printed. This could be done in the controller or in the print engine itself. Alternatively, the reload compensation process could be done on the fly by the print engine as part of a streaming process, where only portions of an image may be modulated at a time.

One specific application of the method of correction described herein is to color test patches for color processing systems. Color process control systems are well known in the art of printing and most of the details do not need to be described herein. For example, U.S. Pat. Nos. 5,784,667, 6,204,869, and 6,351,308, the contents of which are hereby incorporated in their entirety, describe exemplary embodiments of color process control systems.

Color process control systems typically involve writing and sensing control patches on the photoreceptor in the interdocument gap. In some embodiments test patches are developed on media such as, for example, banner sheets. By sensing how much toner is developed in the control patches, the machine can make adjustments to maintain a given level of development. This process helps keeps color consistency throughout a print job.

However, reload error can be a serious problem for the process control system, because, the amount of toner in the control patches is a function not only of the xerographic characteristics of the system, but also of the imaging history that the donor roll has been subjected to prior to writing the control patch. Since the reload error introduced by the imaging history is not taken into account when determining the xerographic adjustments necessary to maintain developability, it can seriously confuse the process control system. For certain types of imaging history that may be encountered, the process control system may actually worsen the performance of the machine relative to open-loop performance.

For example if a test patch of magenta is developed immediately after printing an image of a red sunset, the test patch may be lighter than normal due to reload error. This could cause the process control system to increase the magenta toner transfer, when in fact the magenta output was already accurate. Future images would have too much magenta toner and the problem may or may not be fixed when the next magenta patch is printed., depending upon how magenta heavy the previous few prints were.

However, using the reload error correction process described herein, it should be possible to improve the effectiveness of the process control system. This can be done in multiple ways.

For example, a first method would involve using the reload error correction process described herein to spatially modulate the digital count on any given control patch to compensate for the imaging history as described above with Equations 1–4. This can be done in a manner similar to that proposed for modulating the image, except that the modulation scheme can be further simplified because the control patch is less complex than a potential image. For example, the entire image processing can be done at low resolution (say, 25 dpi) without any need for interpolating to higher resolutions such as 300–600 dpi. If image modulation to compensate for reload error is in place, extending it to the control patches would be straightforward. The result is that the control patch, which could have been made non-uniform by the image history, will now take into account reload error. Application of the reload error compensation process would greatly reduce discrepancies in toner density due to reload error, thereby greatly reducing the influence of image history on the toner control patches. Therefore, the effectiveness of the color process control system is increased.

A second method, which is a simplified version of the method described in the preceding paragraph, can be used with many embodiments of color process control systems. This version involves applying a coarse compensation to the entire patch. This option is attractive because each patch is intended to be uniform in color, which simplifies matters. First, the relevant image history contribution of each low-density pixel in the patch is tracked. The average image history contribution of all the pixels in the patch would then be calculated. This average image history is then used to modulate the entire patch by a particular compensation factor. This would leave the patch in a nonuniform state. However, in embodiments, the sensor reading the patch averages the reading over the patch. Therefore, a color process control system using the adjusted toner patch would output a value approximately the same as that described by the previous method. This second method is less costly and easier to implement than the first method. This method would also be more attractive where no reload error compensation process was in place for regular images.

A third method involves inverting the reload error compensation method described by Equations 1–4. Instead of modulating the digital count on any given control patch before it is printed, the amount of toner sensed from the control patch can be corrected to compensate for reload error problems based upon the imaging history. This option can be implemented within the same device housing the already present process control software. Before determining whether to increase or decrease the toner output, the software would first compensate for error due to reload. If image modulation to compensate for the effect of reload error is not already in place, this approach may be simpler to implement.

Under normal operating conditions, free of reload error, the process control sensor produces a signal S which is a function p of the input digital count D.

$$S=p[D] \quad (5)$$

The function p can be determined by empirical testing. For example, sensor readings could be taken of sheets having spots increasing in color density from 0 to 255 by increments of, for example, 4. These readings can be fitted by any number of techniques to a function. The required number of points taken along the curve may vary depending on the complexity of the curve.

Figure 7:
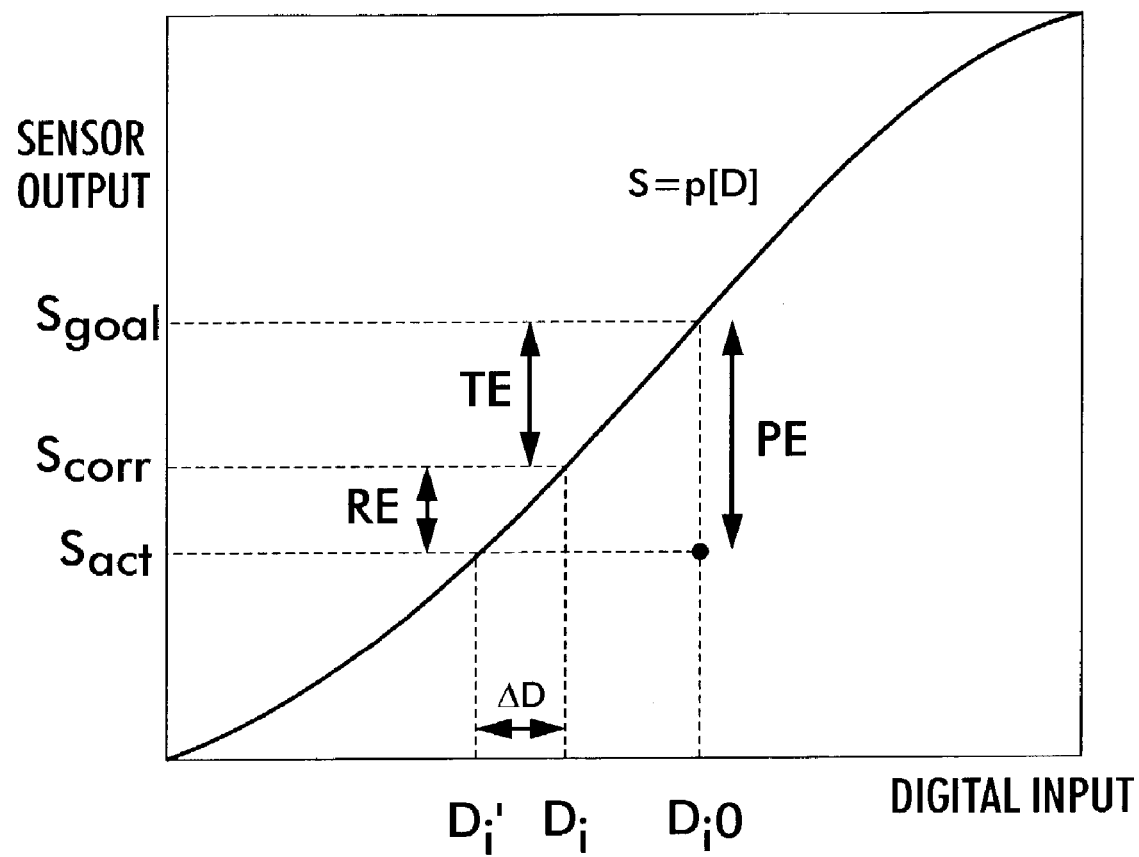
FIG. 7 is a graph illustrating sensor readings versus digital inputs.

FIG. 7 illustrates an exemplary chart of S versus D. The curve shown here is for illustrative purposes and the graph of p[D] could have a significantly different shape based upon the amount of reload in and the xerographic parameters of a particular machine. FIG. 7 shows the relation between the error perceived by the observer (PE), the reload error (RE), and the true error (TE) introduced by the particular xerographic characteristics of the printing device in which the process control system is being used.

When a digital count $D_i^0$ is input to the control patch, the actual sensed output from the process control sensor is $S_{act}$:

$$S_{act}=p[D'_{i=0}]. \quad (6)$$

where $D_i'$ is the unmodified digital count from Equations 1–4. If the engine was in good condition and there was no reload error, the sensed output should have been $S_{goal}$. In the absence of reload error, the process control error signal would be considered to be $S_{goal}-S_{act}$. However, if reload error is present, the actual sensed output $S_{act}$ also includes reload error. The corrected sensed output data should be $S_{corr}$:

$$S_{corr}=p[D_{i=0}], \quad (7)$$

where $D_i$ is the modulated digital count from Equations 1–4. Since the digital image has not been modulated, $S_{corr}$ needs to be redrafted in terms that are known.

First, $$P[D_{i=0}]=p[D_{i=0}'+\Delta D], \quad (8)$$

and where $\Delta D$ is the reload error compensation $\Delta D$ given by Equation 1:

$$\Delta D=D_{i=0}-D'_{i=0}=q[D'_{i=0},D_{(i=1-n)},D^*_{(i=1-n)j}]. \quad (9)$$

The reload error compensation term can be calculated within the digital imaging software and transmitted to the toner sensor software within the printing device. Function q can be simplified as in Equation 4. The inverse function $p^{-1}$ can be found by either analytical or approximation methods. Therefore, the formula for $S_{act}$ can be rewritten as shown below:

$$S_{act}=p[D_{i=0}']\rightarrow D_{i=0}'=p^{-1}[S_{act}]. \quad (10)$$

Therefore, combining Equations 8 and 10, we get the following:

$$S_{corr}=p[\Delta D+p^{-1}(S_{act})]. \quad (11)$$

The modulated sensor data $S_{corr}$ should then be used by the process control system to compensate for the xerographic characteristics of a particular machine.

The ideas presented herein are usable in many mid to high speed printers. Cyclic effects, such as reload error, are common in many systems and digital correction would contribute needed latitude.

The construction of a low resolution imaging history profile would involve a simple four-pixel adder followed by a digital signal processor. A media processor such as, for example, the ETI MAP1000 could also do the job.

While the present invention has been described with reference to specific embodiments thereof, it will be understood that it is not intended to limit the invention to these embodiments. It is intended to encompass alternatives, modifications, and equivalents, including substantial equivalents, similar equivalents, and the like, as may be included within the spirit and scope of the invention.

What is claimed is:

1. A method for improving the image quality, comprising:
    substantially predicting an effect of reload error for at least one separation of a developed image;
    modulating a digital image to compensate for the predicted effect of reload error,
    generating the developed image based upon the modulated digital image.

2. The method of claim 1, wherein modulating the digital image includes modulating the color density of at least one pixel in the digital image.

3. The method of claim 2, wherein the at least one pixel is a plurality of pixels.

4. The method of claim 2, wherein substantially predicting the effect of reload error on a developed image includes predicting a contribution to reload error based upon an initial color density of the at least one pixel of the digital image.

5. The method of claim 4, wherein predicting a contribution to reload error based upon an initial color density of the at least one pixel of the digital image includes
   determining a general relationship between the magnitude of reload error on a developed pixel and the color density of that pixel for a printing device;
   receiving the color density of the at least one pixel of the digital image;
   using the determined relationship between magnitude of reload error on a pixel and the color density of that pixel to predict the contribution to reload error based upon the received color density of the at least one pixel of the digital image corresponding to the developed image.

6. The method of claim 1, wherein substantially predicting an effect of reload error for at least one separation of a developed image includes determining a contribution to reload error based upon the color densities of N previous pixels.

7. The method of claim 6, wherein each pixel is separated in the slow-scan direction by a distance corresponding to the circumference of a roll donating toner to develop the image and is located at substantially the same point in the fast-scan direction.

8. The method of claim 6, wherein N<10.

9. The method of claim 6, where N=3.

10. The method of claim 6, wherein determining a contribution to reload error based upon the color densities of the N previous pixels includes
    determining a general relationship between the magnitude of reload error on a pixel and the color densities of N previous pixels for a printing device;
    receiving the color densities of the previous N pixels printed;
    using the determined relationship between magnitude of reload error on a pixel and the color densities of N previous pixels to predict the contribution to reload error based upon the received color densities of the previous N pixels.

11. The method of claim 6, further comprising combining a damping factor with the color densities of the N previous pixels.

12. The method of claim 6, wherein the contribution to reload error based upon the color densities of the N previous pixels is determined at a pixel resolution of not more than 50 dpi.

13. The method of claim 1, wherein substantially predicting how reload error will affect an image to be printed includes determining a weight factor corresponding to a particular separation.

14. A method for improving image quality of data corresponding to a particular separation, comprising:
    determining a first density factor based upon a color density of at least one pixel of a digital image;
    determining a second density factor based upon at least one previously printed pixel,
    wherein the second density factor is based upon the color density of the at least one previously printed pixel;
    determining a weight factor for the particular separation; and
    modifying the digital image based upon the first density, second density, and weight factors, before printing the image.

15. The method of claim 14, wherein the first density, second density, and weight factors are separable and may each be found independent of the others.

16. The method of claim 14, wherein the at least one pixel is a plurality of pixels.

17. The method of claim 14, wherein the second factor is based upon the color density of the previous N pixels.

18. The method of claim 17, where N=3.

19. The method of claim 17, further comprising a damping factor that is combined with the second density to reduce the effect of previously printed pixels.

20. The method of claim 17, wherein the first factor is calculated at a pixel resolution of at least 300 dpi.

21. The method of claim 14, wherein the second factor is calculated at a pixel resolution of not more than 50 dpi.

22. The method of claim 14, further comprising repeating each of the steps for each additional separation, where the image comprises a plurality of colors.

23. A method for predicting the effect of reload error for a toner color on an image to be developed, comprising:
    determining a first density factor based upon a color density of at least one pixel of a digital image corresponding to the image to be developed for a toner color;
    determining a plurality of pixel history factors, each factor based upon a color density of a previously printed pixel;
    determining a plurality of damping factors, each damping factor corresponding to one of the plurality of pixel history factors;
    modifying each pixel history factor by its corresponding damping factor;
    determining a second density factor by adding the plurality of modified pixel history factors;
    determining a weight factor based upon the toner color itself,
    combining the first density, second density, and weight factors and adding the combination to the digital image before printing the image.

* * * * *